US007020683B2

(12) United States Patent
Newsome

(10) Patent No.: US 7,020,683 B2
(45) Date of Patent: Mar. 28, 2006

(54) METHOD, SERVER AND SYSTEM FOR DYNAMIC SERVER APPLICATION ADJUSTMENT

(75) Inventor: Mark R. Newsome, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 754 days.

(21) Appl. No.: 09/916,895

(22) Filed: Jul. 26, 2001

(65) Prior Publication Data

US 2003/0023699 A1 Jan. 30, 2003

(51) Int. Cl.
*G06F 15/16* (2006.01)
(52) U.S. Cl. ............... 709/203; 709/217; 709/219; 715/501.1; 715/513
(58) Field of Classification Search ............. 709/203, 709/217, 219, 246; 715/501.1, 513, 523; 707/10
See application file for complete search history.

(56) References Cited

U.S. PATENT DOCUMENTS

| 5,892,917 A * | 4/1999 | Myerson ............... 709/224 |
| 6,199,081 B1 * | 3/2001 | Meyerzon et al. ......... 715/513 |
| 6,243,761 B1 * | 6/2001 | Mogul et al. .............. 709/246 |
| 6,507,857 B1 * | 1/2003 | Yalcinalp ................ 715/513 |
| 6,578,000 B1 * | 6/2003 | Dodrill et al. ............ 704/270 |
| 6,715,129 B1 * | 3/2004 | Hind et al. .............. 715/513 |
| 6,766,298 B1 * | 7/2004 | Ravishankar et al. .... 704/270.1 |

* cited by examiner

*Primary Examiner*—Ario Etienne
*Assistant Examiner*—LaShonda Jacobs

(57) ABSTRACT

The present invention provides methods, a server and a system for adjusting the operation of an application of a server during operation of the server. The method may include the steps of preparing a file in a tag-based language format wherein the file includes a desired change in operation of the application, sending the file in the tag-based language format to the server and dynamically changing the application during server operation by implementing the file in the tag-based language format via a control panel that is coupled to the server.

49 Claims, 4 Drawing Sheets

METHOD, SERVER AND SYSTEM FOR DYNAMIC SERVER APPLICATION ADJUSTMENT

FIELD OF THE INVENTION

This invention relates to the tagging and access of files and the like. More particularly, the present invention relates to dynamic adjustment of server applications.

BACKGROUND OF THE INVENTION

Marking up text is a methodology for encoding data with information about the data. Data without context lacks meaning. In order to send data through computers and programs, the data needs to have information with it that explains that what the data means and/or how the unit receiving the data should handle the data.

HyperText Markup Language (HTML) was one of the first markup languages utilized. HTML defines a set of tags that associate formatting rules with portions of text. An HTML processing application such as a web browser is used to read the data and its formatting tags and to display the text in accordance with predefined rules. Since the rules that define the tags are universally known for HTML, the data may be sent over the Internet to virtually anyone and will be displayed in a predetermined fashion based on the HTML rules governing the tags.

Extensible Markup language (XML) was developed because web designers wanted more control over presentation of their data. That is, rather than be restricted to a limited set of tags defined by standards bodies, users in particular businesses wished to be able to develop their own business-specific tag sets to meet their own unique needs without requiring all other users to have a browser that incorporated the functionality for displaying data according to all known business-specific tag set rules. In this manner, each business or industry was able to develop tools that met their own specific needs. In addition, the tags for XML do not need to be limited to formatting rules (as with HTML). Such a system allowed each business or industry to utilize its own terminology for its tags, thus allowing a choice of tags from a larger pool of terms than would be possible if everyone were dealing with a single set of tag rules. Thus, XML is a markup language that uses rule-specifying tags developed by a particular business or industry and has an associated tag-processing application that implements the rules associated with the tags. Hence, XML is an meta-markup language that permits construction of an unlimited number of markup languages based on XML standards, and the rules for the tags may represent data relationships, business rules, or whatever rules the designer wishes.

XML requires a syntax for marking up the data and a defined method of handling the marked-up data. In XML, the definition of a valid markup is provided by a Document Type Definition (DTD) that specifies the structure of the markup language, i.e., how the data is to be marked up. In order to specify what valid tags mean, XML documents have associated therewith style sheets that provide graphical user interface (GUI) instructions for the processing application, e.g., a web browser. The processing application combines the DTD, the logic of the style sheet, and the data to display the data in accordance with the syntax and the defined method.

In early work, Standard Generalized Markup Language (SGML) was developed as an international standard for marking up data. Though SGML was a powerful, extensible tool, it is complex and expensive. If SGML were to have a word processor added to it, SGML would become extremely expensive. The World Wide Web Consortium (W3C) sponsored a group of developers, who simplified the SGML to a format that has evolved to become today's XML. In this manner, a relatively non-complex markup language, XML, was established as an approved language for marking up data.

XML opened up the possibility of providing data that could flexibly be reconfigured from a list to a table without an undue amount of editing of the coding since the GUI was extracted, allowed searching data using data relationships, and improved the portability of data by providing the capability of presenting data that did not have HTML tags that needed to be stripped out when the data was put into, for example, a Java applet. Of course, the drawback is that XML documents must be precisely entered, generally termed "well-formed", into the system because, if the syntax is incorrect, the XML file will simply generate a "fatal error" message. In XML, a "well-formed" document follows the XML syntax rules so that it is readable by a computer. That is, since HTML documents have standard tags, the browsers often have built-in recovery codes that "guess" if a tag is missing at the beginning of an HTML document. In XML, since structured data is used with non-standard tags, the parser typically cannot guess what is missing if a tag is missing.

Since XML documents do not use universally standardized tags, may not contain formatting information, have no application semantics and may need to be presented in a form other than the form transmitted, the XML document needs to have additional information included that sets forth how the information is to be presented or processed. Separation of style from content allows for presentation of the data in more than one way. Style sheets specify the presentation of XML data using two techniques: an optional transformation of the input document into another structure and a description of how to present the transformed information. Because style sheets are extracted from the data, the style sheets may be shared by XML documents and may be written in any selected style language such as, for example, Cascading Style Sheet Language (CSS) or extensible Style Language (XSL).

The XSL language logically consists of three component languages: XPath, XSLT and XSL. Xpath is an XML Path Language for referencing specific parts of an XML document. XSLT is an XSL Transformation Language for describing how to transform one XML document that is represented as a tree into another XML document. XSL is an Extensible Style Sheet Language that uses XSLT together with a description of a set of formatting objects and formatting properties. An XSL style sheet transforms the input document's tree into a result tree that consists of results objects, which may, if desired, be serialized and may be used to write out the document as an HTML document, an XML document in another document type or may match a set of formatting objects and formatting properties. An XSL style sheet contains at least one template, and may have a set of templates that match a set of elements in the source tree and describe the contribution that the matched element makes to the result tree.

In addition to the physical structure, XML documents have a logical structure. Logically, documents include declarations, elements, comments, character references, and processing instructions. The logical elements are indicated in the document by explicit markup. Markup language includes tags, comments, processing instructions, DTDs, references and the like.

Generally, an XML document begins with a declaration that is a processing instruction indicating to the processing agent that the document has been marked up as an XML document. Next, to code the document, one generally provides an element. An element is a basic unit of XML content that includes a start tag, character data and an end tag. The text within the tags is said to be "markup", and proper case must be used (i.e., "NAME" is not the same as "Name"). For example, the following may represent an element: <NAME>John Doe</NAME>.

Other tag-based language formats have also been developed such as, for example, ColdFusion® Markup Language (CFML) format and a Wireless Markup Language (WML) format.

Traditionally, when a developer wished to change information in an application for operating a server, the application had to be shut down, the change entered, and the application restarted. There is a need for providing a method and system for adjusting an operating server application "on the fly", i.e., without shutting down the server application so that the server can maintain efficiency and remain available to users while an application is being changed.

SUMMARY OF THE INVENTION

The present invention provides a method for adjusting operation of an application of a server during operation of the server. In one embodiment, the method generally includes the steps of preparing a file in a tag-based language format wherein the file includes a desired change in operation of the application, sending the file in the tag-based language format to the server, and dynamically changing the application during server operation by implementing the file in the tag-based language format via a control panel that is coupled to the server.

DETAILED DESCRIPTION OF PREFERRED EMBODIMENTS

The present invention provides for dynamically adjusting files in an application on a server while the server is operating. For example, a user may dynamically change a data logging level of an application without shutting it down or recompiling. By writing a file in a tag-based language format such as, for example, an XML or XSL format, the file may be inserted in a servlet and sent to the server to dynamically change a desired file, such as for example, a logging level, in the server application. Where desired, diagnostic information may be logged onto a log file in the tag-based language format, allowing a user to observe a current "logging level" and letting the user write desired information. For example, different information may be written depending on the logging level. Generally, if, for example, the logging levels are INFO, WARNING, ERROR and NONE, the INFO level has the most information, WARNING has less information, ERROR has even less information, and NONE has no logging detail. Where difficulties are being encountered logging onto the system, the control unit may be used to dynamically change the amount of information being logged using the method of the present invention, and thus determine what is causing the problem without shutting down the system. Needed information may be culled by filtering information at the server or querying the application using a web browser and the method of the present invention. Thus, as opposed to the traditional systems that needed to be shut down in order to adjust a parameter or adjust a logging level, the present invention allows the user to adjust the system "on the fly".

Figure 1:
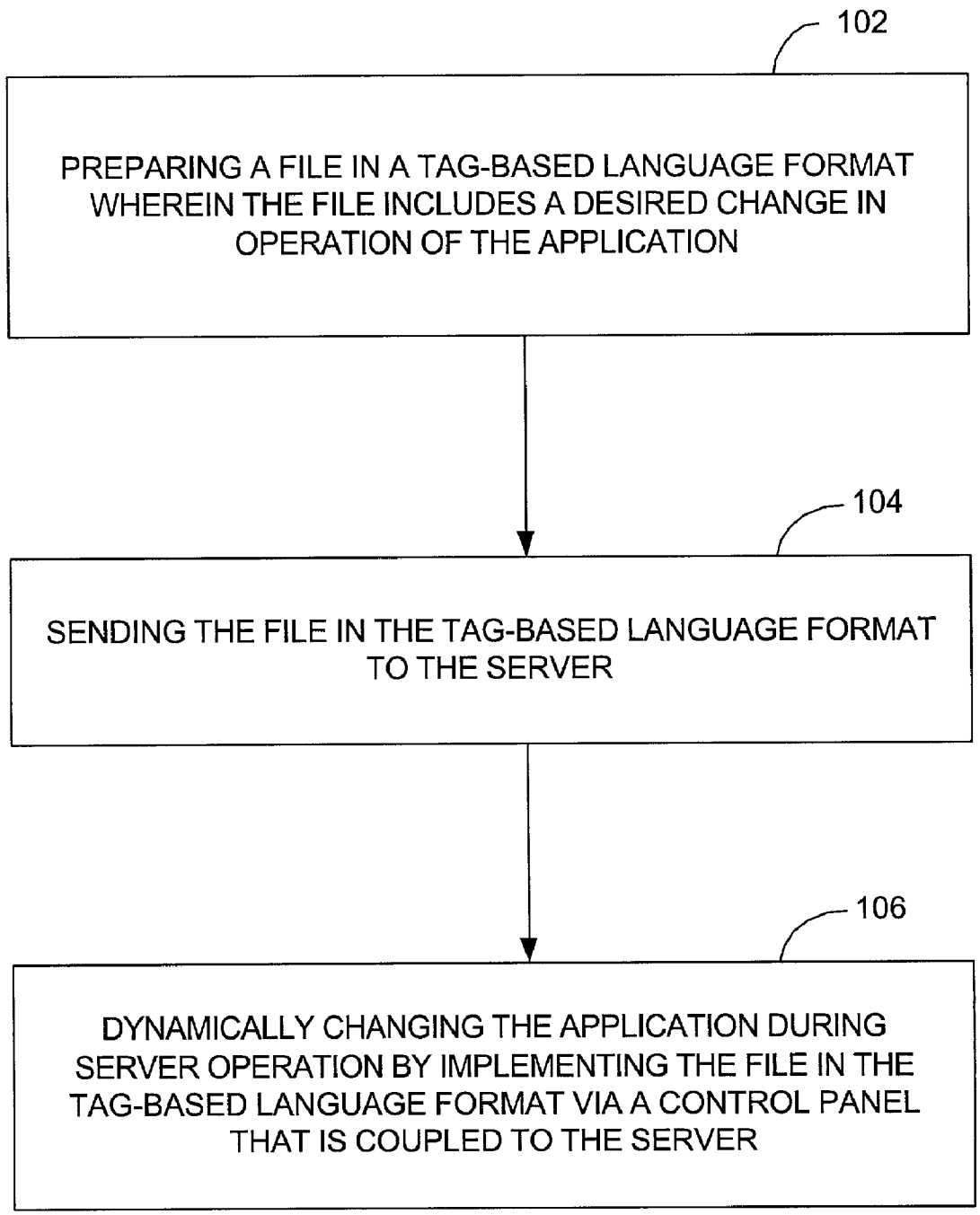
FIG. 1 shows a flow chart of one embodiment of steps in accordance with the method of the present invention.

The present invention provides a method for adjusting operation of an application of a server during operation of the server. As shown in FIG. 1, the steps include preparing 102 a file in a tag-based language format wherein the file includes a desired change in operation of the application, sending 104 the file in the tag-based language format to the server, and dynamically changing 106 the application during server operation by implementing the file in the tag-based language format via a control panel that is coupled to the server. The tag-based language format may be, for example, an eXtensible Markup Language (XML) format, a ColdFusion® Markup Language (CFML) format or a Wireless Markup Language (WML) format. The file in the tag-based language format may include a style sheet. For example, the extensible Style Language (XSL) may be used for the style sheet when XML is used as the tag-based language format. Generally, the style sheet is arranged to permit a user to examine contents of a desired file remotely, generate at least one custom question, generate at least one secure question, and/or remotely adjust the desired file. If the file in the tag-based language format is a log file, the file may include diagnostic information.

Where the file in the tag-based language format is a log file, the step of preparing the file in the tag-based language format may also include placing the log file in a control panel servlet prior to sending the file to the server. For example, the control panel servlet may be utilized to provide a forms-based interface that permits a user to query log interface information from a web browser or to filter log interface information from a web browser.

Where desired, the file in the tag-based language format may include at least one desired change in operation of at least one other application so that at least one other application is dynamically changed during server operation by implementing the file in the tag-based language format.

Where the application is a logging application, the step of dynamically changing the application typically includes dynamically changing a logging level of one or more applications.

Figure 2:
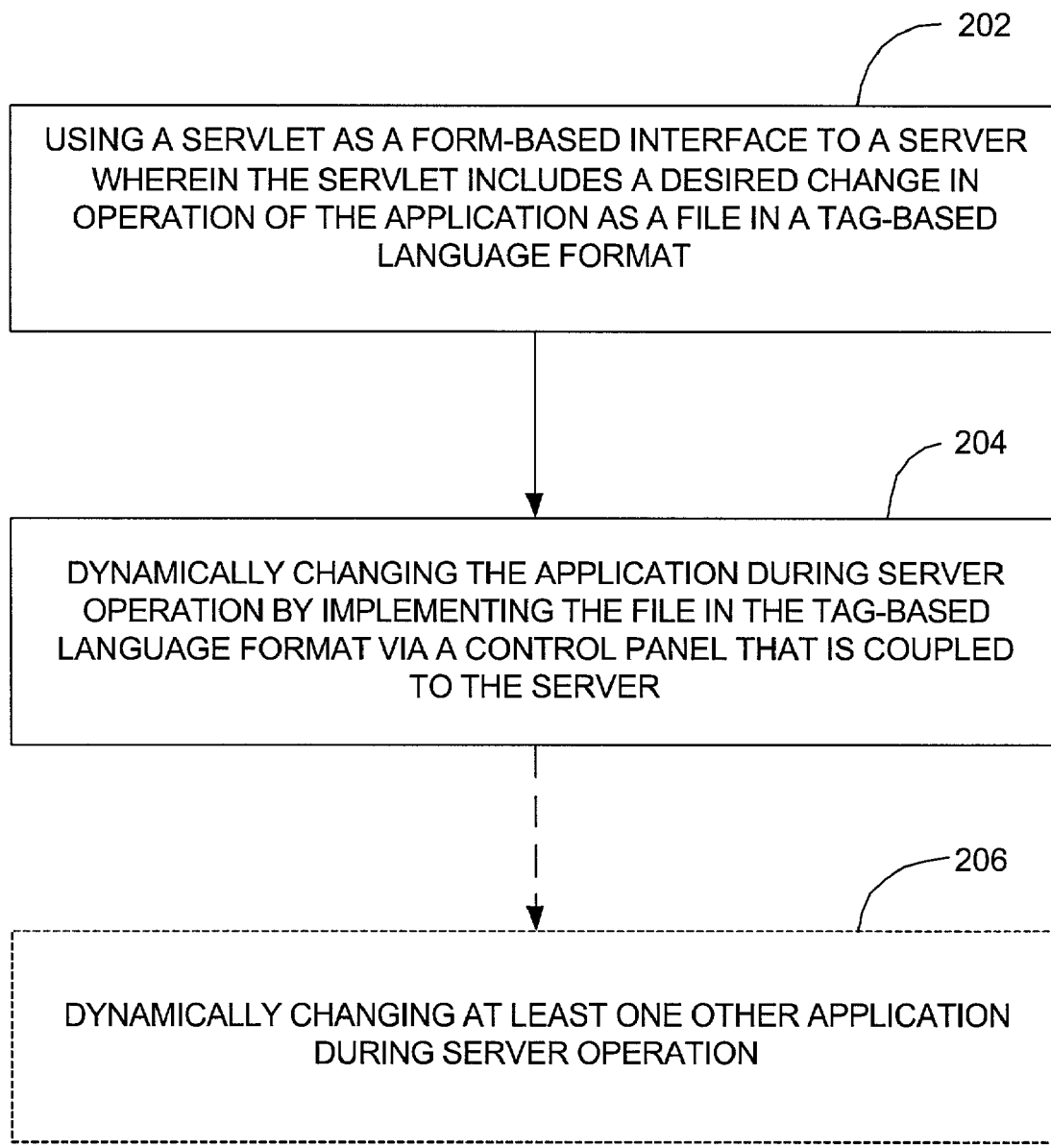
FIG. 2 shows a flow chart of another embodiment of steps in accordance with the method of the present invention.

As shown in FIG. 2, the method may dynamically adjusting operation of a server application by using 202 a servlet as a form-based interface to a server wherein the servlet includes a desired change in operation of the application as a file in a tag-based language format and dynamically changing 204 the application during server operation by implementing the file in the tag-based language format via a control panel that is coupled to the server. Some examples of tag-based language formats that may be used are set forth above. The forms-based interface generally permits querying log interface information from a web browser and/or filtering log interface information from a web browser. Where the file in the tag-based language format includes a style sheet, if desired, the XSL format may be used to provide formatting for a file in the XML format.

Generally, the style sheet is arranged to permit a user to examine contents of a desired file remotely, generate at least one custom question, generate at least one secure question and/or remotely adjust the desired file. If the file in the tag-based language format is a log file, diagnostic information may be included. Where desired, a logging level of an application may be changed dynamically.

In one embodiment, the file in the tag-based language format may include at least one desired change in Operation of at least one other application wherein the at least one other application is dynamically changed 206 during server operation by implementing the file in the tag-based language format via a control panel that is coupled to the server. For example, a fogging level of another application may be changed.

Figure 3:
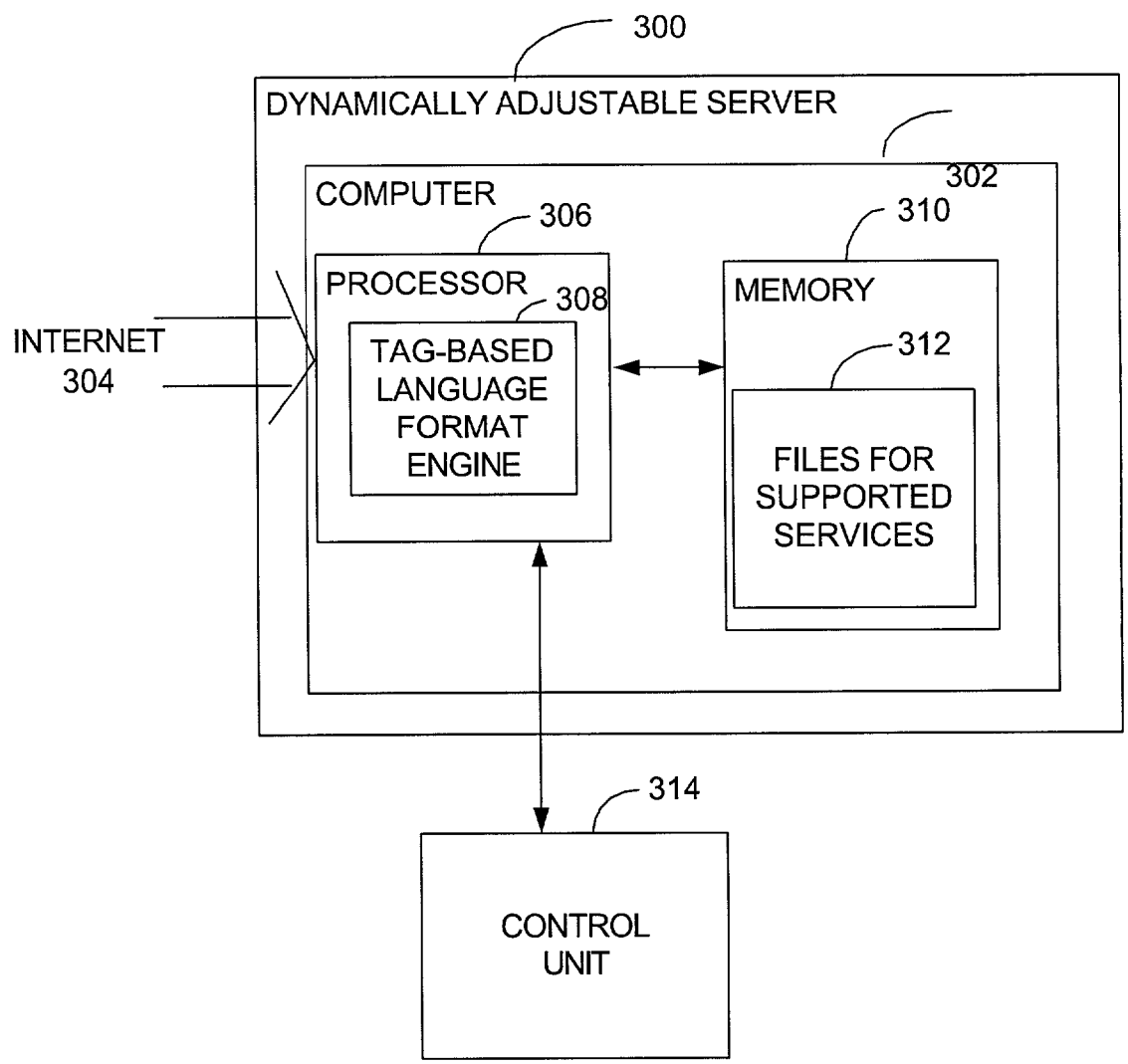
FIG. 3 shows a block diagram of one embodiment of a server in accordance with the present invention.

FIG. 3 shows a block diagram of one embodiment of a dynamically adjustable server 300 in accordance with the present invention. The server includes a computer 302, coupled to the Internet 304 and having at least a processor 306 with a tag-based language format engine 308, a memory 310 coupled to the processor 306 and having stored thereon at least a set of files 312 for each selected supported service and a control unit 314 arranged to communicate with the processor 306, for providing instructions for dynamically adjusting at least one file for at least one application. Sample tag-based language formats are set forth above. At least one of the set of files may be dynamically adjustable using instructions in extensible Style Language (XSL) format for a file in the XML format Where the instructions are in the tag-based language format, such instructions may be arranged to permit a user to examine contents of a desired file remotely, generate at least one custom question, generate at least one secure question, and/or remotely adjust the desired file.

In another embodiment, at least one of the set of files may be dynamically adjustable using instructions in the tag-based language format. Where the file in the tag-based language format is a log file, it may include diagnostic information. Where the file in the tag-based language format is a log file, such a file may be placed in a servlet file, sent to the server by a control panel and used for dynamically adjusting an application. For example, the control panel servlet may provide a forms-based interface that permits a user to query log interface information from a web browser or permits a user to filter log interface information from a web browser.

Where the instructions are implemented by a logging application, a logging level may be dynamically changed.

Where desired, the file in the tag-based language format may include at least one desired change in operation of at least one other application.

Figure 4:
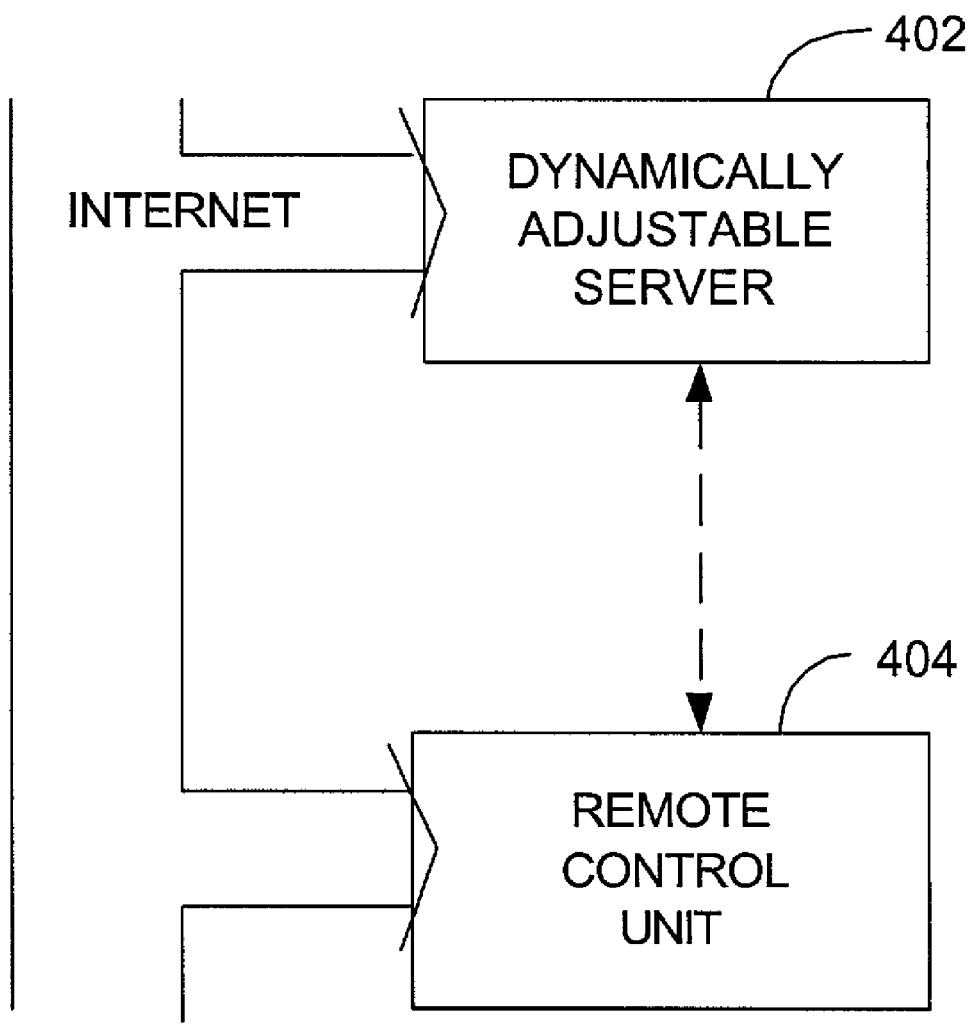
FIG. 4 shows a block diagram of one embodiment of a system in accordance with the present invention.

As shown in FIG. 4, the present invention may provide a system for dynamically adjusting operation of at least one server application. The system includes a remote control unit 402 that is arranged to communicate with a dynamically adjustable server 404. The remote control unit 402 may use a servlet as a form-based interface for the server wherein the servlet includes a desired change in operation of the application as a file in the tag-based language format. The dynamically adjustable server 404 is arranged to communicate with the remote control unit 402 and provides for dynamically changing the at least one server application during server operation by implementing the file in the tag-based language format. Where desired, the forms-based interface may permit querying log interface information from a web browser and/or filtering log interface information from a web browser. The dynamically adjustable server 402 may communicate with the remote control unit 404 via the Internet or may, where desired, be arranged to communicate directly, for example, by being connected by wires or wirelessly (see FIG. 4).

In one embodiment, where the file in an XML format includes a style sheet, extensible Style Language (XSL) format may be used. The style sheet may be arranged to permit a user to examine contents of a desired file remotely, generate at least one custom question, generate at least one secure question and/or remotely adjust the desired file.

Where the file in the tag-based language format is a log file, diagnostic information may be included. For example, where the application is a logging application, a logging level of the application may be changed dynamically. The file in the tag-based language format may be used to implement one or more desired changes in operation of at one or more applications.

Thus, methods, a server and a system have been described for providing a dynamically adjustable server according to the present invention. Many modifications and variations may be made to the techniques and structures described and illustrated herein without departing from the spirit and scope of the invention. Accordingly, it should be understood that the methods, server and system described herein are illustrative only and are not limiting upon the scope of the invention.

What is claimed is:

1. A method for adjusting operation of an application of a server during operation of the server, comprising the steps of:

preparing a file in a tag-based language format wherein the file includes a desired change in operation of the application;

sending the file in the XML format to the server; and dynamically changing the application during server operation without shutting the server down or recompiling the server by implementing the file in the tag-based language format via a control panel that is coupled to the server.

2. The method of claim 1 wherein the tag-based language format is one of: an eXtensible Markup Language (XML) format, a ColdFusion.RTM. Markup Language (CFML) format and a Wireless Markup Language (WML) format.

3. The method of claim 1 wherein the file in the tag-based language format includes a style sheet.

4. The method of claim 3 wherein the style sheet is in extensible Style Language (XSL) and the file is in XML format.

5. The method of claim 3 wherein the style sheet is arranged to at least one of: permit a user to examine contents of a desired file remotely, generate at least one custom question, and generate at least one secure question, and remotely adjust the desired file.

6. The method of claim 1, wherein the file in the tag-based language format is a log file.

7. The method of claim 6 wherein the log file includes diagnostic information.

8. The method of claim 1 wherein the file in the tag-based language format is a log file and the step of preparing the file in the tag-based language format includes placing the log file in a control panel servlet prior to sending the file to the server.

9. The method of claim 8 wherein the control panel servlet provides a forms-based interface that permits a user to query log interface information from a web browser.

10. The method of claim 8 wherein the control panel servlet provides a forms-based interface that permits a user to filter log interface information from a web browser.

11. The method of claim 1 wherein the application is a logging application and the step of dynamically changing the application includes dynamically changing a logging level of the application.

12. The method of claim 1 wherein the file in the tag-based language format includes at least one desired change in operation of at least one other application.

13. The method of claim 12 further including dynamically changing the at least one other application during server operation by implementing the file in the tag-based language format via a control panel that is coupled to the server.

14. The method of claim 13 wherein dynamically changing the at least one other application during server operation includes dynamically changing a logging level of the at least one other application.

15. A method for dynamically adjusting operation of a server application, comprising the steps of:
   using a servlet as a form-based interface to a server wherein the servlet includes a desired change in operation of the application as a file in a tag-based language format; and
   dynamically changing the application during server operation without shutting the server down or recompiling the server by implementing the file in the tag-based language format via a control panel that is coupled to the server.

16. The method of claim 15 wherein the tag-based language format is one of: an eXtensible Markup Language (XML) format, a ColdFusion.RTM. Markup Language (CFML) format and a Wireless Markup Language (WML) format.

17. The method of claim 15 wherein the forms-based interface permits at least one of: querying log interface information from a web browser and filtering log interface information from a web browser.

18. The method of claim 15 wherein the file in the tag-based language format includes a style sheet.

19. The method of claim 18 wherein the style sheet is in extensible Style Language (XSL) and the file is in XML format.

20. The method of claim 19 wherein the style sheet is arranged to at least one of: permit a user to examine contents of a desired file remotely, generate at least one custom question, generate at least one secure question and remotely adjust the desired file.

21. The method of claim 15, wherein the file in the tag-based language format is a log file.

22. The method of claim 21 wherein the log file includes diagnostic information.

23. The method of claim 15 wherein the application is a logging application and the step of dynamically changing the application during server operation includes dynamically changing a logging level of the application.

24. The method of claim 15 wherein the file in the tag-based language format includes at least one desired change in operation of at least one other application.

25. The method of claim 15 further including dynamically changing the at least one other application during server operation by implementing the file in the tag-based language format via a control panel that is coupled to the server.

26. The method of claim 25 wherein dynamically changing the at least one other application during server operation includes dynamically changing a logging level of the at least one other application.

27. A dynamically adjustable server comprising:
   a computer, coupled to the Internet and having at least a processor with a tag-based language format engine, a memory coupled to the processor and having stored thereon at least a set of files for each selected supported service and a control unit arranged to communicate with the processor, for providing instructions for dynamically adjusting at least one file for at least one application while the server is operating and without shutting it down or recompiling it.

28. The server of claim 27 wherein the tag-based language format engine includes at least one of the following tag-based language formats: an extensible Markup Language (XML) format, a ColdFusion.RTM. Markup Language (CFML) format and a Wireless Markup Language (WML) format.

29. The server of claim 27 wherein at least one of the set of files is in XML format and is dynamically adjustable using instructions in extensible Style Language (XSL) format.

30. The server of claim 29 wherein the instructions in the XSL language format are arranged to at least one of: permit a user to examine contents of a desired file remotely, generate at least one custom question, and generate at least one secure question, and remotely adjust the desired file.

31. The server of claim 27 wherein at least one of the set of files is dynamically adjustable using instructions in the tag-based language format.

32. The server of claim 31, wherein the file in the tag-based language format is a log file.

33. The server of claim 32 wherein the log file includes diagnostic information.

34. The server of claim 32 wherein the file in the tag-based language format is a log file and is dynamically adjusted by a servlet file sent from a control panel.

35. The server of claim 34 wherein the servlet sent from the control panel provides a forms-based interface that permits a user to query log interface information from a web browser.

36. The server of claim 34 wherein the servlet sent from the control panel provides a forms-based interface that permits a user to filter log interface information from a web browser.

37. The server of claim 27 wherein the instructions are implemented by a logging application and a logging level is dynamically changed.

38. The server of claim 27 wherein the file in the tag-based language format includes at least one desired change in operation of at least one other application.

39. A system for dynamically adjusting operation of at least one server application, comprising:
   a remote control unit, arranged to communicate with a dynamically adjustable server, for using a servlet as a form-based interface for the server wherein the servlet includes a desired change in operation of the at least one server application as a file in a tag-based language format; and
   the dynamically adjustable server, arranged to communicate with the remote control unit, for dynamically changing the at least one server application during server operation without shutting the server down or recompiling the server by implementing the file in the tag-based language format.

40. The system of claim 39 wherein the tag-based language format includes at least one of the following tag-based language formats: an extensible Markup Language (XML)

format, a ColdFusion.RTM. Markup Language (CFML) format and a Wireless Markup Language (WML) format.

41. The system of claim 39 wherein the forms-based interface permits at least one of: querying log interface information from a web browser and filtering log interface information from a web browser.

42. The system of claim 39 wherein the file in the tag-based language format includes a style sheet.

43. The system of claim 42 wherein the style sheet is in extensible Style Language (XSL) and the file is in XML format.

44. The system of claim 42 wherein the style sheet is arranged to at least one of: permit a user to examine contents of a desired file remotely, generate at least one custom question, generate at least one secure question and remotely adjust the desired file.

45. The system of claim 39, wherein the file in the tag-based language format is a log file.

46. The system of claim 45 wherein the log file includes diagnostic information.

47. The system of claim 39 wherein the at least one server application is a logging application and the step of dynamically changing the logging application during server operation includes dynamically changing a logging level of the logging application.

48. The system of claim 39 wherein the file in the tag-based language format includes at least one desired change in operation of at least one other server application and dynamically changes the at least one other server application during server operation by implementing the file in the tag-based language format.

49. The system of claim 48 wherein a logging level of the at least one other server application is changed.

* * * * *

UNITED STATES PATENT AND TRADEMARK OFFICE
CERTIFICATE OF CORRECTION

| | | |
|---|---|---|
| PATENT NO. | : 7,020,683 B2 | Page 1 of 1 |
| APPLICATION NO. | : 09/916895 | |
| DATED | : March 28, 2006 | |
| INVENTOR(S) | : Mark R. Newsome | |

It is certified that error appears in the above-identified patent and that said Letters Patent is hereby corrected as shown below:

In column 5, line 16, delete "fogging" and insert -- logging --, therefor.

Signed and Sealed this

Twenty-third Day of June, 2009

JOHN DOLL
*Acting Director of the United States Patent and Trademark Office*